(12) United States Patent
Oroskar et al.

(10) Patent No.: US 10,136,370 B1
(45) Date of Patent: Nov. 20, 2018

(54) METHOD AND SYSTEM FOR USING PUBLIC LAND MOBILE NETWORK IDENTIFIER TO MAINTAIN DEVICE SERVICE IN A NETWORK

(71) Applicant: Sprint Spectrum L.P., Overland Park, KS (US)

(72) Inventors: Siddharth S. Oroskar, Overland Park, KS (US); Jasinder P. Singh, Olathe, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 167 days.

(21) Appl. No.: 14/926,518

(22) Filed: Oct. 29, 2015

(51) Int. Cl.
*H04W 36/00* (2009.01)
*H04W 68/00* (2009.01)
*H04W 36/14* (2009.01)
*H04W 88/06* (2009.01)
*H04W 84/04* (2009.01)

(52) U.S. Cl.
CPC ... *H04W 36/0083* (2013.01); *H04W 36/0022* (2013.01); *H04W 36/14* (2013.01); *H04W 68/005* (2013.01); *H04W 88/06* (2013.01); *H04W 84/042* (2013.01)

(58) Field of Classification Search
CPC ............ H04W 36/0022; H04W 36/00; H04W 36/0066
See application file for complete search history.

(56) References Cited

U.S. PATENT DOCUMENTS

| | | | |
|---|---|---|---|
| 2014/0348064 A1* | 11/2014 | Jeong | H04W 48/18 370/328 |
| 2016/0262004 A1* | 9/2016 | Telang | H04W 8/02 |
| 2016/0345210 A1* | 11/2016 | Shan | H04W 36/0022 |

* cited by examiner

*Primary Examiner* — Vladimir Magloire
*Assistant Examiner* — Donald H B Braswell (57) ABSTRACT

Disclosed herein is a method and corresponding system for controlling operation of a user equipment device (UE) in a communication system comprising a first network and a second network interconnected with the first network. The UE may detect a public land mobile network identifier (PLMN ID) broadcast by a base station of the first network, where the base station does not support circuit switched fallback (CSFB) between the two networks The UE may determine, based on the detected PLMN ID, whether to operate in a first mode or a second mode, where (i) the first mode comprises, in response to the base station not supporting CSFB, the UE declining to be served by the base station and the UE instead being served directly by the second network and (ii) the second mode comprises the UE being served by the base station. The UE may then operate in the determined mode.

13 Claims, 4 Drawing Sheets

METHOD AND SYSTEM FOR USING PUBLIC LAND MOBILE NETWORK IDENTIFIER TO MAINTAIN DEVICE SERVICE IN A NETWORK

BACKGROUND

In wireless communication systems, wireless service providers may operate radio access networks (RANs), each RAN including a number of base stations radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

Further, a RAN may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communication (GSM), WI-FI, and BLUETOOTH. Each protocol may define its own procedures for registration of UEs, initiation of communications, handover between coverage areas, and functions related to air interface communication.

In accordance with the air interface protocol, each of the coverage areas of such a RAN may operate on one or more carrier frequencies and may define a number of air interface channels for carrying information between the base station and UEs. By way of example, each coverage area may define a pilot channel, reference channel or other resource on which the base station may broadcast a pilot signal, reference signal, or the like that UEs may detect as an indication of coverage and may measure to evaluate coverage strength. Further, each coverage area may define a downlink control channel for carrying system information, page messages, and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a RAN (e.g., powers on or moves into coverage of the RAN), the UE may detect a reference signal and read system information broadcast from a base station and may engage in a process to register itself to be served by the base station and generally by the RAN. For instance, the UE may transmit an attach message on an uplink control channel to the base station, and the base station and/or supporting infrastructure may then responsively authenticate and authorize the UE for service, establish a record indicating where in the RAN the UE is operating, establish local profile or context records for the UE, and provide an attach accept message to the UE. Thereafter, the UE may then be served by the RAN in an idle mode or a connected/active mode. In the idle mode, the UE may monitor a downlink control channel to detect page messages and other information regarding incoming communications and may similarly transmit uplink control signaling to initiate communications or for other reasons. And in the connected/active mode, the UE may have particular traffic channel resources assigned by the RAN, which the UE may use to engage in communication of bearer traffic and the like.

When a UE is served in a particular base station coverage area, the UE may also regularly monitor the reference signal strength in that coverage area and in other coverage areas of the RAN, in an effort to ensure that the UE operates in the best (e.g., strongest) coverage area. If the UE detects threshold weak coverage from its serving coverage area and sufficiently strong coverage from another coverage area, the UE may then engage in a handover process by which the UE transitions to be served by the other coverage area. In the idle mode, the UE may do this autonomously and might re-register in the new coverage area. Whereas, in the connected/active mode, the UE may regularly report signal strengths to its serving base station when certain thresholds are met, and the base station and/or supporting infrastructure may work to hand the UE over to another coverage area.

In general, a wireless service provider may operate one or more such RANs as a public land mobile network (PLMN) for serving UEs that subscribe to service of the provider. For example, a service provider may operate a CDMA PLMN and may provide UEs with subscriptions that allow the UEs to receive CDMA service from that PLMN. As another example, a service provider may operate an LTE RAN as a PLMN and may provide UEs with subscriptions that allow the UEs to receive LTE service from that PLMN. And as another example, a service provider may operate both a CDMA PLMN and an LTE PLMN and may provide UEs with subscriptions that allow the UEs to receive both CDMA service from the CDMA PLMN and LTE service from the LTE PLMN. In these examples, the particular service provider with whom the owner or operator of the UE enters into a subscription agreement may be referred to as the UE's "home service provider."

A RAN operating as a PLMN may have an associated PLMN identifier (PLMN ID), and base stations of the RAN may be arranged to broadcast that PLMN ID to indicate that the base stations are part of that PLMN. UEs that subscribe to service of a wireless service provider's PLMN may then be provisioned with data indicating the PLMN ID of the PLMN and with logic that causes the UEs to prefer service by base stations broadcasting that PLMN ID. Further, UEs that subscribe to service of multiple PLMNs, such as both an LTE PLMN and a CDMA PLMN may be provisioned with data indicating the PLMN IDs of each such PLMN and with logic that causes the UEs to prefer service by base stations broadcasting one or more of those PLMN IDs.

Although a UE's home service provider may strive to offer wireless coverage throughout a region, however, the home service provider may not actually operate or otherwise provide coverage in all locations throughout the region. To fill in gaps where the home service provider does not operate or otherwise provide its own base stations, the home service provider may enter into roaming agreements with other service providers, referred to as "roaming partners" or "roaming service providers," whom may provide other PLMNs. Under a roaming agreement, a roaming partner may agree to have its base stations serve the home service provider subscriber UEs and to provide connectivity with the home service provider's network infrastructure so that the home service provider can authenticate and authorize the subscriber UEs and the home service provider's network infrastructure can provide the subscriber UEs with packet-data network connectivity.

Some wireless communication systems may encompass multiple separate but interconnected RANs, such as a first RAN that provides high speed data communications and a second RAN (i.e., a "fallback" RAN) that provides traditional telephony service, each RAN operating in accordance with a different air interface protocol. Such a hybrid system may be configured to support an inter-RAN fallback process in which the first RAN passes various signaling, such as pre-registration signaling and call-setup signaling, between the second RAN and UEs served by the first RAN in order to facilitate transition of UEs from being served by the first RAN to being served with voice calls by the second RAN. For instance, a hybrid system that includes an LTE RAN for data communications and a circuit-switched RAN, such as a CDMA RAN (or GSM RAN or the like), for legacy telephone service may support an example inter-RAN fallback process referred to as "circuit-switched fallback" (CSFB). With such an arrangement, a UE may be programmed to scan for and attach with the LTE RAN by default and to then register with the CDMA RAN by engaging in pre-registration signaling through the LTE RAN. In particular, after the UE attaches with an LTE base station, the UE may then transmit to the LTE base station a CDMA pre-registration request message, and that message may pass through the LTE RAN to the CDMA RAN, leading to pre-registration of the UE with the CDMA RAN. Thereafter, when the UE has a voice call to place or the CDMA RAN has a voice call to connect to the UE, call-setup signaling may similarly pass between the UE and the CDMA RAN via the LTE RAN, at which point the UE may then conveniently switch over to be served by a CDMA base station and to engage in the voice call.

In a hybrid system, a UE may be arranged to support both service provided by the first RAN and service provided by the second RAN, and further might be arranged to engage in signaling with the second RAN via the first RAN to facilitate transition of the UE from being served by the first RAN to being served with voice calls by the second RAN. For instance, such a UE may include both a first radio for being served by the first RAN and a second radio for being served by the second RAN, and may also include program logic that allows the UE to engage in the inter-RAN fallback process described above. A UE that is arranged in this manner may be referred to herein as a UE that supports the inter-RAN fallback process. In the context of an LTE/CDMA hybrid system, for instance, such a UE may be referred to herein as a "CSFB-capable" UE. Further, when a base station of the first RAN is arranged to pass signaling between the UE and the second RAN that will serve the UE with a voice call as described above, such a base station may be referred to as a base station that supports the inter-RAN fallback process or a base station that supports CSFB.

Overview

In practice, a CSFB-capable UE may have two separate, mutually exclusive modes of operation including (i) a first mode of operation (also referred to herein as "CSFB mode") and (ii) a second mode of operation (also referred to herein as "single-radio LTE (SRLTE) mode"). In CSFB mode, which could be the UE's default mode, when the UE detects coverage of a given base station of the first RAN (i.e., an LTE RAN), the UE may determine whether the base station supports CSFB. If the base station supports CSFB, the UE may then responsively opt to be served by the base station and engage in pre-registration signaling with the second RAN via the first RAN (i.e., via the base station) in order to register for CSFB service of the second RAN (e.g., a CDMA RAN or other circuit-switched RAN), and may thereafter engage in call-setup signaling with the second RAN, via the first RAN, to receive/place a voice call as noted above. Whereas, if the base station does not support CSFB, the UE may then responsively decline to be served by the base station and instead leave service of the first RAN altogether, transitioning to be served instead directly by the second RAN, and operating via the second RAN for an extended period of time, such as thirty minutes, an hour, or longer.

In SRLTE mode, on the other hand, when the UE detects coverage of a given base station of the first RAN, the UE may opt to be served by the base station regardless of whether the base station does not support CSFB. Further, SRLTE mode may also involve the UE registering with the second RAN via a base station of the second RAN. Thereafter, while in SRLTE mode, the UE may then operate in the first RAN for data service, but may (i) periodically tune away to search for page messages from the second RAN (i.e., for a UE-terminated call), or (ii) move over to the second RAN to originate a voice call.

Unfortunately, there may be scenarios in which it may be problematic to have the UE transition to be served directly by the second RAN as a result of the UE operating in CSFB mode and the base station at issue not supporting CSFB. For instance, there may be a problem scenario in which the UE is within coverage of a base station that does not support CSFB, and the only available circuit-switched coverage is poor or otherwise undesirable coverage of the second RAN. In this scenario, while the UE is operating in CSFB mode, the UE may detect that the base station does not support CSFB and responsively transition to be served instead directly by the second RAN, and consequently, the UE may experience the poor or otherwise undesirable coverage of the second RAN for an extended period of time. In a more specific example of this scenario, the first RAN may be the UE's home service provider's LTE RAN, the second RAN may be a roaming partner CDMA RAN, and the base station may be located at or near the border of the first RAN such that the only available circuit-switched coverage is that of the second RAN. In this specific case, while the UE is being served directly by the second RAN, the UE (and also perhaps the UE's home service provider) may incur roaming charges, and the UE may generally experience poorer or otherwise less desirable service than the UE would have received from the first RAN.

Therefore, it may be desirable in these scenarios to provide a mechanism for triggering the UE to instead operate in a different mode, such as SRLTE mode, in which the UE would not transition to be served directly by the second RAN. To facilitate this, one or more base stations of the first RAN (such as those in the problem scenario discussed above) may be arranged to broadcast a special PLMN ID that is associated with SRLTE mode. As such, when the UE detects the special PLMN ID, the UE will responsively switch from operating in CSFB mode to instead operating in SRLTE mode. As a result, the UE may avoid scenarios in which the UE, as a result of the UE operating in CSFB mode, may have normally transitioned to be served directly by the second RAN with poorer or otherwise less desirable service.

Accordingly, disclosed herein is a method and system to help control operation of a CSFB-capable UE in a hybrid system, particularly in a scenario in which the UE is within coverage of a base station of the first RAN, where the base station does not support CSFB, and where the circuit-switched coverage of the second RAN is undesirable. In line with the arrangement described above, the UE in this scenario will detect a PLMN ID broadcast by the base station, and use the detected PLMN ID as a basis for deciding whether to operate in CSFB mode or rather to operate in SRLTE mode.

In one respect, for instance, disclosed is a method for controlling operation of a UE in a wireless communication system comprising a first RAN and a second RAN, where the first RAN has a plurality of base stations configured to provide service according to a first air interface protocol, where the second RAN is configured to provide service according to a second air interface protocol, and where the first RAN has an interconnection with the second RAN. The method involves the UE detecting a PLMN ID broadcast by a base station of the plurality, where the base station does not support CSFB between the first RAN and the second RAN. Further, the method involves the UE determining, based on the detected PLMN ID, whether to operate in a first mode (e.g., CSFB mode) or rather to operate in a second mode (e.g., SRLTE mode), where (i) the first mode comprises, in response to the base station not supporting CSFB, the UE declining to be served by the base station and the UE instead being served directly by the second RAN and (ii) the second mode comprises the UE being served by the base station, even though the base station does not support CSFB. The method then involves the UE operating in the determined mode.

In an example implementation of the disclosed method, the UE may make the determination of whether to operate in CSFB mode or rather to operate in SRLTE mode (and may even begin to operate in the determined mode) without explicitly having determined that the base station does not support CSFB. Alternatively, in another example implementation, the UE may first determine that the base station does not support CSFB, and in response to determining that the base station does not support CSFB, the UE may then determine whether to operate in CSFB mode or rather to operate in SRLTE mode.

In line with the discussion above, the base station may be arranged to broadcast a special PLMN ID that has a predefined value (e.g., a series of bits) associated with SRLTE mode, in order to trigger the UE to switch from operating in CSFB mode to instead operating in SRLTE mode (provided that the UE is CSFB-capable and the base station does not support CSFB). Accordingly, in another respect, disclosed is a method for controlling operation of a UE in a wireless communication system comprising a first RAN and a second RAN, where the first RAN has a plurality of base stations configured to provide service according to a first air interface protocol, where the second RAN is configured to provide service according to a second air interface protocol, and where the first RAN has an interconnection with the second RAN. The UE at issue in this method has two mutually exclusive modes of operation including a first mode of operation and a second mode of operation, the first mode comprising, when the UE detects coverage of a given base station of the plurality and when the given base station does not support CSFB between the first RAN and the second RAN, the UE responsively declines to be served by the given base station and the UE instead becomes served directly by the second RAN, and the second mode comprising, when the UE detects coverage of a given base station of the plurality, the UE becoming served by the given base station, even though the given base station does not support CSFB.

The method may involve the UE operating in the first mode. Further, the method may involve the UE detecting a PLMN ID broadcast by a base station of the plurality, where the base station does not support CSFB. Still further, the method may involve the UE determining that the detected PLMN ID has a predefined value associated with operating in the second mode. The method may then involve, in response to the determination that the detected PLMN ID has the predefined value associated with operating in the second mode, the UE switching from operating in the first mode to instead operating in the second mode.

Further, in another respect, disclosed is a UE comprising a first radio, a second radio, and a control unit. The first radio is configured for the UE to be served by a first RAN according to a first air interface protocol, where the first RAN has a plurality of base stations configured to provide service, and where the first RAN has an interconnection with a second RAN. The second radio is then configured for the UE to be served by the second RAN according to a second air interface protocol. And the control unit is configured to (i) detect a PLMN ID broadcast by a base station of the plurality, where the base station does not support CSFB between the first RAN and the second RAN, and where the PLMN ID is a PLMN ID of a home service provider of the UE, (ii) determine, based on the detected PLMN ID, whether to operate in a first mode or rather to operate in a second mode, and (iii) operate in the determined mode. The first mode of the UE comprises, in response to the base station not supporting CSFB, the UE declining to be served by the base station and the UE instead being served directly by the second RAN, and the second mode of the UE comprises the UE being served by the base station, even though the base station does not support CSFB.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present methods and system will be described by way of example in the context of a hybrid LTE/CDMA communication system that supports CSFB. However, it should be understood that principles described herein can apply as well in numerous other contexts, such as in numerous other RAN arrangements, and with various other protocols or combination of protocols. Further, it should be understood that the various arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

Figure 1:
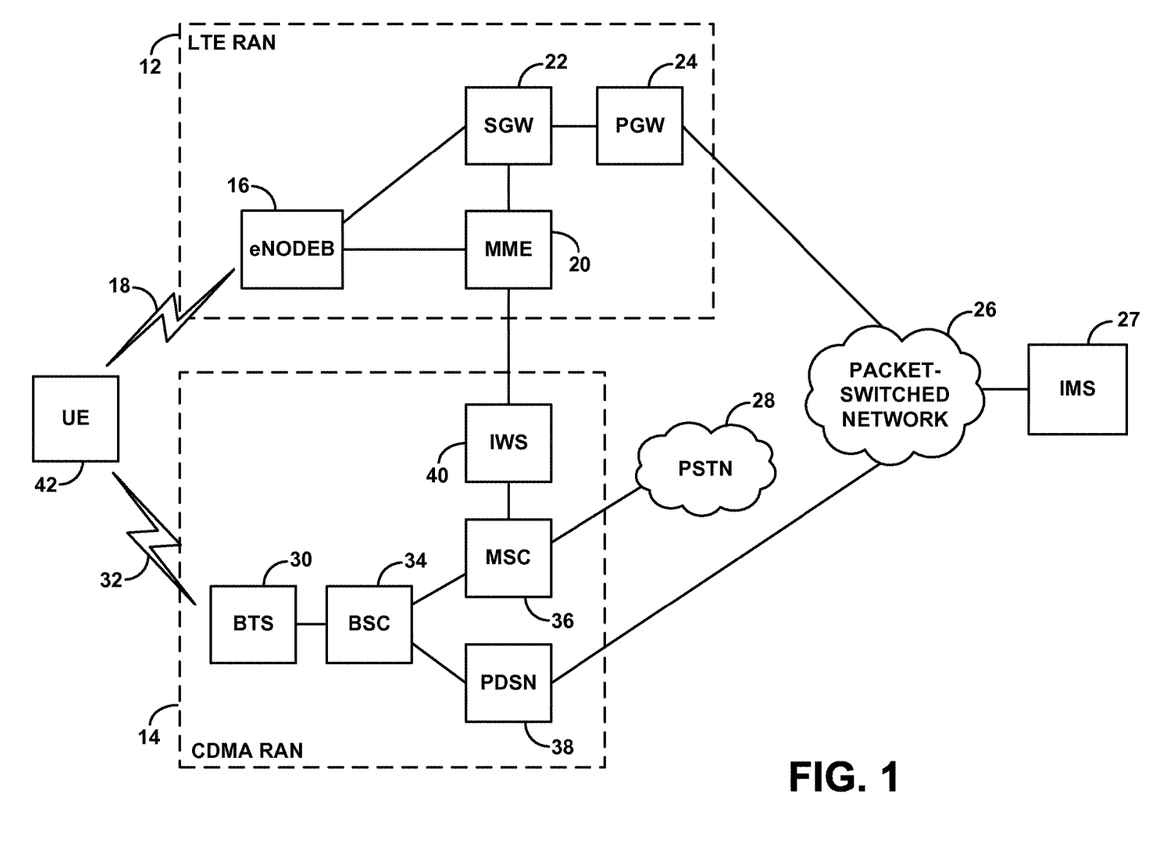
FIG. 1 is a simplified block diagram of a network arrangement in which aspects of the present disclosure can be implemented.

FIG. 1 is a simplified block diagram of an example system, including an LTE RAN 12 and a CDMA RAN 14, where the CDMA RAN is a fallback network in line with the discussion above. In the example system, the LTE RAN primarily serves UEs with wireless packet data communication service. Whereas the CDMA RAN primarily serves UEs with wireless circuit-switched voice call service but may also provide packet-data communication service and other types of service. Both of these RANs may be operated as PLMNs by a common wireless service provider, which may enable the provider to serve subscribed UEs with high speed packet data service (including possibly voice-over-packet service, such as voice over LTE (VoLTE)) through the LTE RAN and traditional cellular voice call service through the CDMA RAN. Alternatively, these RANs may be operated by different wireless service providers. For instance, in line with the discussion above, a first service provider may operate the LTE RAN as an LTE PLMN, and a roaming partner of the first service provider (i.e., a second, different service provider) may operate the CDMA RAN as a CDMA PLMN.

The LTE RAN 12 in the example system is shown including a representative LTE base station 16 known as an eNodeB, which includes an antenna structure and associated equipment for providing a respective LTE coverage area 18 in which UEs can be served by the eNodeB on a respective carrier frequency and thus by the LTE RAN. Other eNodeBs (not shown) may exist in this hybrid system as well, each defining their own respective LTE coverage area. In practice, each eNodeB of the LTE RAN, including eNodeB 16, may be arranged to broadcast on a respective carrier frequency a reference signal that UEs may detect as an indication of LTE coverage. Further, each eNodeB of the LTE RAN may be arranged to broadcast as system information their PLMN ID to indicate that they are part of the LTE RAN.

Further, the eNodeB 16 is shown having a communication interface with an MME 20 that functions as a signaling controller for the LTE RAN. Still further, the eNodeB is also shown having a communication interface with a serving gateway (SGW) 22, which is in turn shown having a communication interface with a packet-data network gateway (PGW) 24 that provides connectivity with a packet-switched network 26, and the MME is shown having a communication interface with the SGW. In practice, the illustrated components of the LTE RAN may sit as nodes on a private packet-switched network owned by an operator of the LTE RAN, and thus the various communication interfaces may be logical interfaces through that network.

In addition, shown sitting on or accessible via the packet-switched network 26 is an Internet Multimedia Subsystem (IMS) platform 27. IMS 27 may include various proxy servers and application servers, such as a media server, and may function to provide to UEs served by the LTE RAN packet-based real-time media communication services, such as a VoIP calling service (e.g., VoLTE calls) when the UEs subscribe to such services.

The CDMA RAN 14 is shown including a representative CDMA base station 30 known as a base transceiver station (BTS), which includes an antenna structure and associated equipment for providing a CDMA coverage area 32 in which UEs can be served by the BTS and thus by the CDMA RAN. The BTS is then shown in communication with a base station controller (BSC) 34, which is in turn shown in communication with a mobile switching center (MSC) 36 that provides connectivity with the PSTN 28 and in communication with a packet data serving node (PDSN) 38 that provides connectivity with the packet-switched network 26. Other BTSs (not shown) may exist in this hybrid system as well, each defining their own CDMA coverage area.

Further shown in FIG. 1 is an interworking server (IWS) 40, which provides connectivity between the LTE RAN and the CDMA RAN to facilitate exchange of signaling messages (such as CSFB registration and call-setup messages, etc.) between the RANs. The IWS may be provided as an element of either one of the RANs or as an element separate from but connected to each RAN, and in a representative arrangement as shown has a communication interface (e.g., an S102 interface) with the MME of the LTE RAN and a communication interface with the MSC of the CDMA RAN. In practice, the IWS may conveniently facilitate setup of CDMA calls for a UE while the UE is served by the LTE RAN, so that the UE can then seamlessly transition from being served by the LTE RAN to engaging in the calls served by the CDMA RAN. In particular, certain call setup signaling that would normally flow over the CDMA air interface between the UE and a CDMA BTS and in turn between the BTS and the MSC will instead flow over the LTE air interface between the UE and an LTE eNodeB, between the eNodeB and the MME, between the MME and the IWS, and between the IWS and the MSC.

FIG. 1 illustrates a representative UE 42 located within both coverage area 18 of the LTE RAN and coverage area 32 of the CDMA RAN. This UE is a hybrid telephony device (e.g., cell phone or other such device) that is CSFB-capable, meaning that the UE is arranged to support both LTE service and CDMA service, and is further arranged to engage in signaling with the CDMA RAN via the LTE RAN to facilitate transition of the UE from being served by the LTE RAN to being served with voice calls by the CDMA RAN. For instance, a CSFB-capable UE may include both a CDMA radio for being served by the CDMA RAN and an LTE radio for being served by the LTE RAN, and may also include program logic that allows the UE to engage in the CSFB process described above.

In typical practice with the arrangement of FIG. 1, upon entry of UE 42 into coverage area 18 of the LTE RAN, the UE may detect a reference signal broadcast from eNodeB 16 on a particular carrier frequency. Upon detecting the reference signal, the UE may responsively then engage in random access signaling with the eNodeB (to notify the eNodeB that the UE is trying to gain access) and request the eNodeB to establish for the UE a radio resource control (RRC) connection between the UE and the eNodeB on the particular carrier frequency, so that the eNodeB may then serve the UE on that carrier frequency. Further, the UE may engage in attach signaling with the LTE RAN via the eNodeB to register the UE with the LTE RAN on that carrier frequency, which may result in the LTE RAN and supporting network infrastructure establishing for the UE of one or more bearers extending between the UE and the PGW, each including a radio-bearer portion between the UE and the eNodeB and an access-bearer portion between the eNodeB and the PGW (via the SGW).

Furthermore with this arrangement, while UE 42 is registered with the LTE RAN or perhaps without the UE being registered with the LTE RAN, the UE may detect coverage of the CDMA RAN (e.g., coverage area 32) and may register with the CDMA RAN directly via the CDMA BTS 30. In particular, the UE may detect a pilot signal broadcast by BTS 30 and responsively transmit a registration request message to the BTS, which the BTS may then forward (perhaps via the BSC 34) to the MSC 36. The MSC may then engage in signaling with a home location register (HLR) (not shown) to register the UE as being served by the MSC, so that calls to the UE can be connected to the UE via the MSC. Once the UE is registered with the CDMA RAN, the UE may then operate in an idle mode within coverage area 32. Thereafter, when the UE has a call to receive/place, the UE may engage in call-setup signaling directly with the CDMA RAN over the CDMA interface to set up such calls. For instance, when the MSC has a call to connect to the UE, the MSC may cause the BTS to page the UE, and the UE may respond to the page(s) from the BTS, which may result in the BTS assigning a traffic channel on which the UE may then engage in the call. And when the UE has a call to place, the UE may transmit an origination request message to the MSC via the BTS, which may result in (i) the BTS assigning a traffic channel for the call, (ii) the MSC engaging in signaling to set up the call with the called party, and (iii) the UE then engaging in the call on the assigned channel.

In line with the discussion above, a UE such as UE 42 may have an SRLTE mode of operation. With the arrangement shown in FIG. 1, for instance, UE operation in SRLTE mode may involve the UE engaging in the access/attach signaling discussed above, through which the UE registers with the LTE RAN via eNodeB 16. Further, UE operation in SRLTE mode may involve the UE separately registering with the CDMA RAN directly via BTS 30. Thereafter, the UE may then operate in the LTE RAN for data service, but may engage in call-setup signaling directly via the CDMA interface as described above, such as by periodically tuning away to search for page messages from the CDMA RAN (for a UE-terminated call) or by moving over to the CDMA RAN to originate a call.

Furthermore, a CSFB-capable UE such as UE 42 may have a CSFB mode of operation, additionally or alternatively to having the SRLTE mode of operation. With the arrangement shown in FIG. 1, for instance, UE operation in CSFB mode may involve the UE registering with the LTE RAN via eNodeB 16 as discussed above. Further, the UE may then register with the CDMA RAN via the LTE RAN. To facilitate this in practice, as noted above, the UE may transmit to the eNodeB a CDMA pre-registration request message, and that message may pass through the LTE RAN to the CDMA RAN (via IWS 40), leading to pre-registration of the UE with the CDMA RAN.

After the UE in CSFB mode is registered with the LTE RAN and the CDMA RAN, CDMA call-setup signaling can pass via the LTE RAN (i.e., between the UE and the CDMA RAN via the LTE air interface). For instance, when the CDMA RAN has a call to connect to the UE, the CDMA RAN may transmit a page message to the IWS, which the IWS may pass along to the LTE RAN to trigger paging of the UE via the LTE RAN. The LTE RAN may responsively then page the UE by having the eNodeB transmit a CSFB page message to the UE over the RRC connection between the eNodeB and the UE, which may cause the UE to respond to the CSFB page message with a CSFB extended service request (ESR) message, the ESR message perhaps taking the form of a CDMA (e.g., 1×RTT) origination request encapsulated in an LTE signaling header. In addition, the eNodeB may request the UE to scan for coverage of the CDMA RAN (e.g., coverage of BTS 30) and provide a measurement report, which the LTE RAN may pass with the UE's ESR to the CDMA RAN. The CDMA RAN (e.g., BTS 30, as directed by the MSC 36) may then assign a CDMA traffic channel to the UE and transmit to the UE (via the LTE RAN) a traffic channel assignment message for the assigned channel, and the UE may then leave LTE service and transition to engage in the call via the CDMA RAN on the assigned traffic channel. Likewise, when the UE has a call to originate, the UE may send an ESR message to the eNodeB, and similar CDMA call-setup signaling via the LTE RAN may then occur.

As noted above, however, a given LTE eNodeB may or may not support CSFB for various reasons, such as the LTE RAN not being coupled with the CDMA RAN, the given eNodeB experiencing a threshold extend of CSFB failure, or perhaps the eNodeB not being provisioned with data or logic to facilitate the CSFB process described above. As such, each LTE eNodeB (including eNodeB 16) may be arranged to provide UEs with an indication of whether or not the eNodeB supports CSFB. For instance, an eNodeB may periodically broadcast a system parameter (e.g., a "CSFB supported" flag), and UEs served by the eNodeB would interpret the presence of the parameter as indicating that the eNodeB supports CSFB. Alternatively, the eNodeB may not broadcast such a parameter, and UEs served by the eNodeB would interpret the absence of that parameter as indicating that the eNodeB does not support CSFB.

In practice, if a UE is configured to use CSFB service (i.e., the UE is a CSFB-capable UE) and the UE detects coverage of an LTE eNodeB but determines that the eNodeB does not support CSFB, the UE may responsively leave service of the LTE RAN altogether, transitioning to be served instead directly by the CDMA RAN, so as to be able to place and receive voice calls. However, as discussed above, there may be scenarios in which this may be problematic. For instance, if the eNodeB does not support CSFB and the only available circuit-switched coverage near the eNodeB is poor or otherwise undesirable coverage of the CDMA RAN, the UE may detect that the eNodeB does not support CSFB and responsively transition to be served instead directly by the CDMA RAN. Consequently, the UE may experience poor or otherwise undesirable coverage of the CDMA RAN for an extended period of time, and may experience other problems as well during that period of time (e.g., incurring undesired charges).

Thus, it may be advantageous to provide a mechanism for triggering CSFB-capable UEs in such scenarios to switch from operating in CSFB mode to instead operating in SRLTE mode, so that the UEs will not leave LTE service altogether. To facilitate this in practice, a service provider of the LTE RAN may make use of a PLMN ID broadcasted by eNodeBs having the problem scenario noted above as a means to cause CSFB-capable UEs in that scenario to decide whether to operate in CSFB mode or instead to operate in SRLTE mode. In accordance with the present disclosure, the UE may detect the broadcasted PLMN ID and use the detected PLMN ID as a basis for deciding whether to operate in CSFB mode or instead operate in SRLTE mode.

As discussed above, a service provider operating the LTE RAN as a PLMN may typically arrange each eNodeB of the LTE PLMN to broadcast a regular PLMN ID interpretable by CSFB-capable and non-CSFB-capable UEs alike to perform various UE operations with respect to that eNodeB (e.g., detecting whether the eNodeB is a home or roaming eNodeB, attaching/registering with the eNodeB, etc.). In order to facilitate the disclosed process, however, the service provider may modify this typical arrangement by provisioning certain eNodeBs of the LTE PLMN (e.g., eNodeB 16, and/or other eNodeB(s) having the problem scenario noted above) to broadcast, in addition to or alternatively to the regular PLMN of that LTE PLMN, a different, special PLMN ID interpretable by CSFB-capable UEs to cause such UEs to switch from operating in CSFB mode to instead operating in SRLTE mode. By way of example, the service provider may provision such eNodeBs to broadcast a special PLMN ID having a predefined value that is associated with operating in SRLTE mode, and upon a CSFB-capable UE detecting that the PLMN ID has the predefined value, the UE may responsively switch from operating in CSFB mode to instead operating in SRLTE mode. Further, it should be noted that non-CSFB-capable UEs within coverage of such eNodeBs would interpret the special PLMN ID in the same way as the non-CSFB-capable UEs would interpret the regular PLMN ID.

In an example implementation of the disclosed process, the UE may detect the PLMN ID of the eNodeB and responsively determine whether the PLMN ID has the predefined value associated with operating in SRLTE mode. To facilitate this in practice, the UE may include program logic that causes the UE to determine whether the PLMN ID has the predefined value, and the UE may thus execute that logic to determine whether the PLMN ID has the predefined value. The UE may then use the determination of whether the PLMN ID has the predefined value as a basis for deciding whether to operate in CSFB mode or instead to operate in SRLTE mode. For instance, if the UE determines that the PLMN ID has the predefined value, the UE may decide to switch from operating in CSFB mode to instead operating in SRLTE mode. Whereas, if the UE determines that the PLMN ID does not have the predefined value, the UE may decide to continue to operate in CSFB mode.

The UE may be configured to check the PLMN ID for the predefined value in the manner described above regardless of whether the UE first determines whether the eNodeB supports CSFB. In an alternate implementation of this process, however, the UE may be configured check the PLMN ID for the predefined value in the manner described above in response to the UE first determining that the eNodeB does not support CSFB. In this alternate implementation, the UE could determine that the eNodeB does not support CSFB in various ways. For example, the UE may detect, in a message broadcast by the eNodeB, an indication of the eNodeB's lack of CSFB support, such as an absence of a CSFB-supported flag as discussed above. Alternatively, the UE may be provisioned with data that includes the PLMN IDs of various eNodeBs, and correlates each eNodeB with an indication of whether or not that particular eNodeB supports CSFB. Accordingly, the UE may refer to this data and, using the detected PLMN ID to look up the eNodeB, determine that the eNodeB is correlated with an indication that the eNodeB does not support CSFB.

Further, in still other implementations, the UE may be arranged to first check the PLMN ID for the predefined value, and to interpret the predefined value as an indication (i) that the eNodeB does not support CSFB, and (ii) that the UE should switch from operating in CSFB mode to operating in SRLTE mode. In such implementations, the UE may use this particular indication as a basis for deciding to switch to operating in SRLTE mode.

Moreover, the disclosed process may be implemented in various network arrangements. For example, the service provider of the LTE RAN may be the UE's home service provider, or a roaming partner of the UE's home service provider. Likewise, the service provider of the CDMA RAN may be the UE's home service provider, or a roaming partner of the UE's home service provider.

Figure 2:
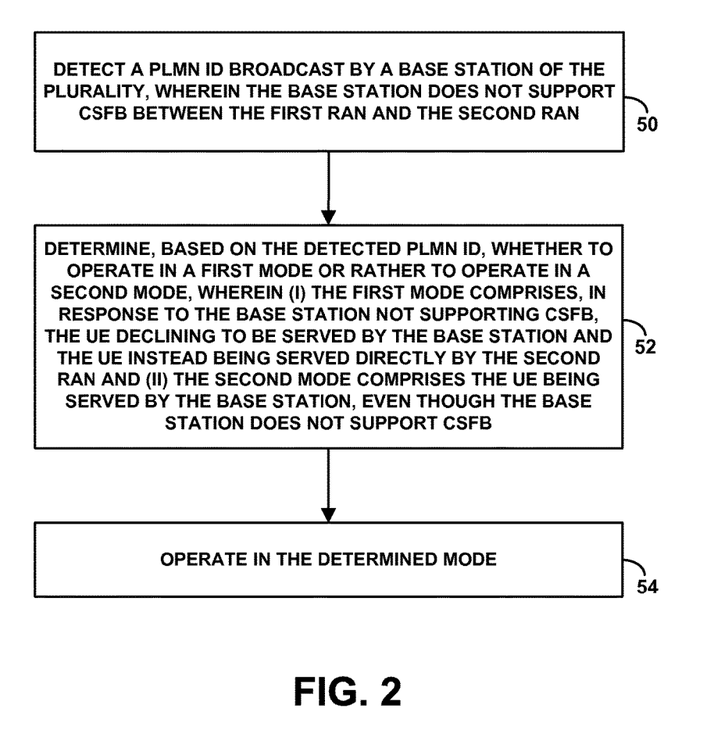
FIG. 2 is a flow chart depicting functions that can be carried out in accordance with the present disclosure.

FIG. 2 is next a flow chart depicting operations of a UE such as UE 42 in line with the discussion above. The UE would operate in a wireless communication system comprising a first RAN and a second RAN, where the first RAN would provide a plurality of base stations each configured to provide service according to a first air interface protocol (e.g., LTE). The first RAN would also have an interconnection with a second RAN that is configured to provide service according to a second air interface protocol (e.g., CDMA).

As shown in FIG. 2, at block 50, the UE detects a PLMN ID broadcast by a base station of the plurality, where the base station does not support CSFB between the first RAN and the second RAN. Further, at block 52, the UE then determines, based on the detected PLMN ID, whether to operate in a first mode or rather to operate in a second mode, where (i) the first mode comprises, in response to the base station not supporting CSFB, the UE declining to be served by the base station and the UE instead being served directly by the second RAN and (ii) the second mode comprises the UE being served by the base station, even though the base station does not support CSFB. And at block 54, the UE operates in the determined mode.

Various other features described above could be incorporated into this method as well. For instance, in practice, the second mode may further comprise the UE registering to be served by the second RAN, where the registering occurs without the UE engaging in registration signaling with the second RAN over the interconnection between the first RAN and the second RAN (i.e., the UE registering with the second RAN via a base station of the second RAN, and not via the first RAN).

As noted above, in some implementations of this process, the UE may determine whether the detected PLMN ID has a predefined value associated with operating in the second mode, and then use that determination as a basis for determining whether to operate in the first mode or rather to operate in the second mode. For instance, the UE may determine to operate in the second mode only if the determination is that the detected PLMN ID has the predefined value. Whereas, if the determination is that the detected PLMN ID does not have the predefined value, the UE may determine to operate in the first mode.

Furthermore, in line with the discussion above, the PLMN ID at issue may be a PLMN ID of a home service provider of the UE, or may be a PLMN ID of a roaming partner of the home service provider of the UE. In either case, the base station may be arranged in some implementations to broadcast both a first PLMN ID that does not have the predefined value, and a second, different PLMN ID that does have the predefined value. Accordingly, upon detecting the PLMN ID, the UE may apply program logic that causes the UE to determine whether the PLMN ID is the first PLMN ID (of the UE's home service provider, or of the roaming partner) or is rather the second, different PLMN ID (of the UE's home service provider, or of the roaming partner).

Moreover, in line with the discussion above, the UE may engage in this process in a scenario in which the UE has entered into coverage of, but not yet attached with, the base station at issue. As such, the UE may use the detected PLMN ID (and perhaps additionally a determination of whether the eNodeB supports CSFB) as a basis for deciding whether to operate in SRLTE mode and thereby attach with the eNodeB.

Figure 3:
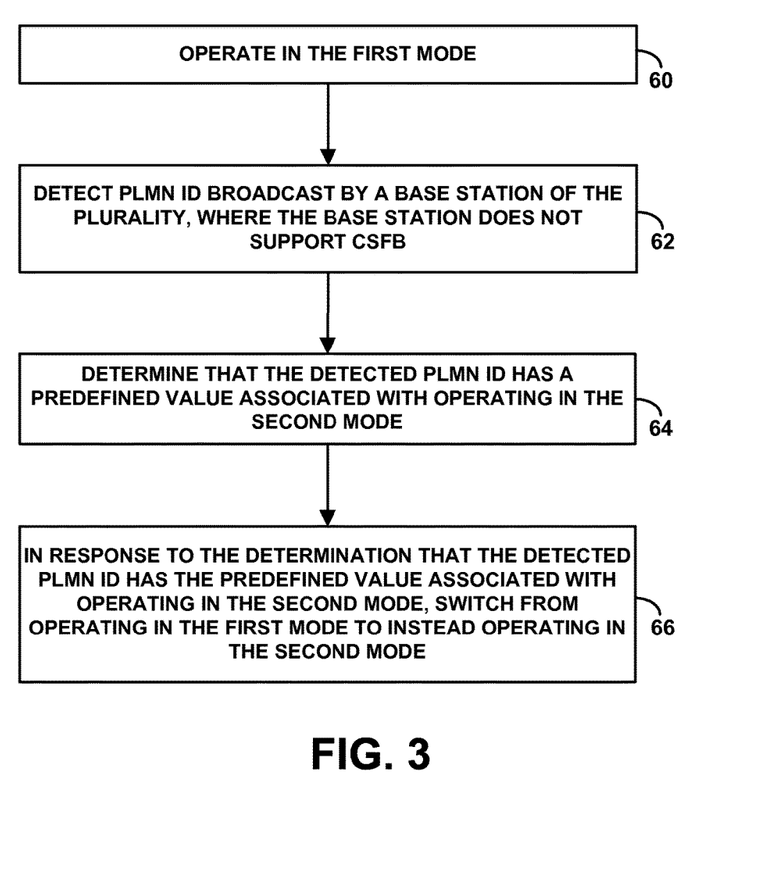
FIG. 3 is another flow chart depicting functions that can be carried out in accordance with the present disclosure.

FIG. 3 is next another flow chart depicting operations of a UE such as UE 42, that has two mutually exclusive modes of operation including the first mode of operation (e.g., CSFB mode) and the second mode of operation (e.g., SRLTE mode) discussed above. Further, the UE would operate in a wireless communication system such as the system described with respect to FIG. 2.

As shown in FIG. 3, at block 60, the UE operates in the first mode. Further, at block 62, the UE detects a PLMN ID broadcast by a base station of the plurality, where the base station does not support CSFB. Still further, at block 64, the UE determines that the detected PLMN ID has a predefined value associated with operating in the second mode. And at block 66, in response to the determination that the detected PLMN ID has the predefined value associated with operating in the second mode, the UE switches from operating in the first mode to instead operating in the second mode. Various other features described above could be incorporated into this method as well.

As noted above, in some implementations of this process, the UE may switch to operating in the second mode without the UE having determined whether the base station supports CSFB. In these implementations, the detected PLMN ID may or may not explicitly indicate that the base station does not support CSFB, but in either case, the UE may switch to operating in the second mode without explicitly determining whether the base station supports CSFB. Alternatively, in other implementations, the UE may first determine that the base station does not support CSFB before determining that the detected PLMN ID has the predefined value. In these and other implementations, the operation of the UE switching to operating in the second mode may be performed further in response to a determination that the base station does not support CSFB.

Figure 4:
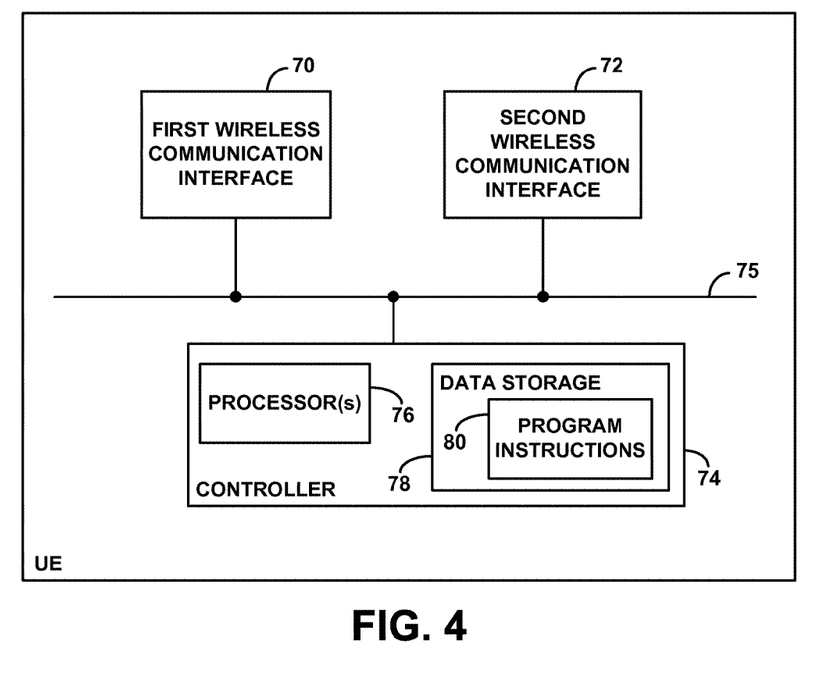
FIG. 4 is a simplified block diagram of example RAN components that are operable in accordance with the disclosure.

Finally, FIG. 4 is a simplified block diagram of a representative UE such as UE 42, showing some of the components that may be included in such a device. As shown in FIG. 4, the representative UE includes a first wireless communication interface (e.g., radio) 70, a second wireless communication interface (e.g., radio) 72, and a controller 74, all of which may be communicatively linked together by a system bus, network or other connection mechanism 75.

The first wireless communication interface 70 may be configured for the UE to be served by a first RAN according to a first air interface protocol, such as LTE or another air interface protocol discussed above. Similarly, the second wireless communication interface 72 may be configured for the UE to be served by a second RAN according to a second air interface protocol, such as CDMA, GSM, or another air interface protocol discussed above. In practice, these two wireless communication interfaces could be provided in the communication device as separate chipsets or other components, or could be integrated together on a single chipset or the like, and may include separate or integrated antennas.

The controller 74 may be configured to cause the UE to carry out various operations described herein. The controller 74 may take various forms, including various combinations of hardware, firmware, and software for instance. By way of example, the controller could comprise at least one processor 76, such as one or more general purpose processors (e.g., microprocessors) and/or one or more special purpose processors (e.g., application specific integrated circuits). The controller could also comprise one or more non-transitory data storage elements (e.g., magnetic, optical, and/or flash storage), such as data storage 78. The data storage could then hold program instructions 80 executable by the processor(s) 78 to carry out various operations described herein. In addition, the program instructions 80 may include instructions that allow the UE to engage in CSFB. As such, the UE may be a CSFB-capable UE.

In an example implementation, the controller 74 may be arranged to (i) detect a PLMN ID broadcast by a base station of the first RAN, where the base station does not support CSFB, and where the PLMN ID is a PLMN ID of a home service provider of the UE, (ii) determine, based on the detected PLMN ID, whether to operate in a first mode or rather to operate in a second mode, and (iii) operate in the determined mode, where (a) the first mode comprises, in response to the base station not supporting CSFB, the UE declining to be served by the base station and the UE instead being served directly by the second RAN and (b) the second mode comprises the UE being served by the base station, even though the base station does not support CSFB. Further, as discussed above, the UE may be configured to normally operate by default in the first mode and may switch to operate in the second mode only if the UE determines that the detected PLMN ID has a predefined value associated with the second mode.

Exemplary embodiments have been described above. Those skilled in the art will understand, however, that changes and modifications may be made to these embodiments without departing from the true scope and spirit of the invention.

What is claimed is:

1. A method for controlling operation of a user equipment device (UE) in a wireless communication system comprising a first radio access network (RAN) and a second RAN, wherein the first RAN has a plurality of base stations configured to provide service according to a first air interface protocol, wherein the second RAN is configured to provide service according to a second air interface protocol, and wherein the first RAN has an interconnection with the second RAN, the method comprising:

detecting, by a UE, broadcast of a public land mobile network identifier (PLMN ID) by a base station of the plurality, wherein the base station does not support circuit switched fallback (CSFB) between the first RAN and the second RAN, and wherein the detected PLMN ID is of a home service provider of the UE;

determining by the UE whether the detected PLMN ID of the home service provider has a predefined value that is associated with operating in a Single Radio Long Term Evolution (SRLTE) mode in which (a) the UE is served by the base station for data service even though the base station does not support CSFB and (b) the UE is set to engage in voice calls served directly by the second RAN; and controlling by the UE, based on the determination of whether the detected PLMN ID of the home service provider has the predefined value associated with operating in the SRLTE mode, whether the UE operates in the SRLTE mode or rather operates in a CSFB mode in which, because the base station does not support CSFB, the UE declines to be served by the base station and is served directly by the second RAN, wherein if the determination is that the detected PLMN ID of the home service provider has the predefined value associated with operating in the SRLTE mode, then the UE operates in the SRLTE mode, and if the determination is that the detected PLMN ID of the home service provider does not have the predefined value associated with operating in the SRLTE mode, then the UE operates in the CSFB mode.

2. The method of claim 1,
wherein the home service provider has a first PLMN ID having the predefined value and a second PLMN ID having a second, different predefined value,
wherein determining whether the detected PLMN ID of the home service provider has the predefined value associated with operating in the SRLTE mode comprises determining whether the detected PLMN ID of the home service provider has the predefined value rather than the second predefined value.

3. The method of claim 1,
wherein controlling, based on the determination of whether the detected PLMN ID of the home service provider has the predefined value associated with operating in the SRLTE mode, whether the UE operates in the SRLTE mode or rather operates in the CSFB mode comprises causing the UE to operate in the SRLTE mode only if the determination is that the detected PLMN ID of the home service provider has the predefined value associated with operating in the SRLTE mode.

4. The method of claim 1,
wherein controlling, based on the determination of whether the detected PLMN ID of the home service provider has the predefined value associated with operating in the SRLTE mode, whether the UE operates in the SRLTE mode or rather operates in the CSFB mode comprises:
first determining by the UE that the base station does not support CSFB,
responsive to determining that the base station does not support CSFB, then determining whether the detected PLMN ID of the home service provider has the predefined value associated with operating in the SRLTE mode, and controlling by the UE, based on the determination of whether the detected PLMN ID of the home service provider has the predefined value associated with operating in the SRLTE mode, whether the UE operates in the SRLTE mode or rather operates in the CSFB mode.

5. The method of claim 1,
wherein the UE operates in the SRLTE mode if both (i) the determination is that the detected PLMN ID of the home service provider has the predefined value associated with operating in the SRLTE mode and (ii) the predefined value indicates that the base station does not support CSFB.

6. The method of claim 1, wherein operating in the SRLTE mode further comprises the UE registering to be served by the second RAN without the UE engaging in registration signaling with the second RAN over the interconnection between the first RAN and the second RAN.

7. A method for controlling operation of a user equipment device (UE) in a wireless communication system comprising a first radio access network (RAN) and a second RAN,
wherein the first RAN has a plurality of base stations configured to provide service according to a first air interface protocol, wherein the second RAN is configured to provide service according to a second air interface protocol, wherein the first RAN has an interconnection with the second RAN,
wherein the UE has two mutually exclusive modes of operation including a circuit switched fallback (CSFB) mode of operation and a Single Radio Long Term Evolution (SRLTE) mode of operation,
wherein operating in the CSFB mode comprises, when the UE detects coverage of a given base station of the plurality and when the given base station does not support CSFB between the first RAN and the second RAN, the UE responsively declines to be served by the given base station and the UE instead becomes served directly by the second RAN, and
wherein operating in the SRLTE mode comprises (i) the UE being served by a given base station of the plurality for data service even though the given base station does not support CSFB and (ii) the UE being set to engage in voice calls served directly by the second RAN,
the method comprising:
operating by the UE in the CSFB mode;
detecting by the UE broadcast of a public land mobile network identifier (PLMN ID) by a base station of the plurality, wherein the base station does not support CSFB, and wherein the detected PLMN ID is of a home service provider of the UE;
determining by the UE that the detected PLMN ID of the home service provider has a predefined value associated with operating in the SRLTE mode; and
in response to the determination that the detected PLMN ID of the home service provider has the predefined value associated with operating in the SRLTE mode, the UE switching from operating in the CSFB mode to instead operating in the SRLTE mode.

8. The method of claim 7, further comprising:
before determining that the detected PLMN ID of the home service provider has the predefined value associated with operating in the SRLTE mode, determining by the UE that the base station does not support CSFB,
wherein determining that the detected PLMN ID of the home service provider has the predefined value associated with operating in the SRLTE mode is performed in response to the determination that the base station does not support CSFB.

9. The method of claim 7, further comprising:
determining that the detected PLMN ID of the home service provider indicates that the base station does not support CSFB,
wherein switching from operating in the CSFB mode to instead operating in the SRLTE mode is performed further in response to the determination that the detected PLMN ID of the home service provider indicates that the base station does not support CSFB.

10. The method of claim 7, wherein the operating, the detecting, and the determining are performed while the UE is not being served by the base station, and
wherein operating in the SRLTE mode further comprises the UE engaging in signaling with the base station to register the UE with the base station.

11. A user equipment device (UE) comprising:
a first radio configured for the UE to be served by a first radio access network (RAN) according to a first air interface protocol, wherein the first RAN has a plurality of base stations configured to provide service, and wherein the first RAN has an interconnection with a second RAN;
a second radio configured for the UE to be served by the second RAN according to a second air interface protocol; and
a control unit configured to (i) detect broadcast of a public land mobile network identifier (PLMN ID) by a base station of the plurality, wherein the base station does not support circuit switched fallback (CSFB) between the first RAN and the second RAN, and wherein the detected PLMN ID is of a home service provider of the UE, (ii) determine whether the detected PLMN ID of the home service provider has a predefined value that is associated with operating in a first mode, and (iii) control, based on the determination of whether the detected PLMN ID of the home service provider has the predefined value associated with operating in the first mode, whether the UE operates in the first mode or rather operates in a second mode, wherein if the determination is that the detected PLMN ID of the home service provider has the predefined value associated with operating in the first mode, then the UE operates in the first mode, and if the determination is that the detected PLMN ID of the home service provider does not have the predefined value associated with operating in the first mode, then the UE operates in the second mode, wherein the first mode is a Single Radio Long Term Evolution (SRLTE) mode in which (a) the UE is served by the base station for data service even though the base station does not support CSFB (b) the UE registers to be served by the second RAN, and (c) the UE is set to engage in voice calls with the second RAN, wherein the registering occurs without the UE engaging in registration signaling with the second RAN over the interconnection between the first RAN and the second RAN, and wherein the second mode is a CSFB mode in which, in response to the base station not supporting CSFB, the UE declines to be served by the base station and the UE instead is served directly by the second RAN.

12. The UE of claim 11, wherein the home service provider has a first PLMN ID having the predefined value and a second PLMN ID having a second, different predefined value, wherein determining whether the detected PLMN ID of the home service provider has the predefined value that is associated with operating in the first mode comprises determining whether the detected PLMN ID of the home service provider has the predefined value rather than the second predefined value.

13. The UE of claim 11, wherein controlling, based on the determination of whether the detected PLMN ID of the home service provider has the predefined value associated with operating in the SRLTE mode, whether the UE operates in the SRLTE mode or rather operates in the CSFB mode comprises causing the UE to operate in the first mode only if the determination is that the detected PLMN ID of the home service provider has the predefined value associated with operating in the first mode.

* * * * *